US007270156B2

(12) United States Patent
Beesley et al.

(10) Patent No.: US 7,270,156 B2
(45) Date of Patent: *Sep. 18, 2007

(54) BEVERAGE MIXER AND HEATER

(75) Inventors: Brian K. Beesley, Holladay, UT (US); Thomas E. Daniels, Jr., Sandy, UT (US)

(73) Assignee: Back to Basics Products, LLC, Vernon Hills, IL (US)

( * ) Notice: Subject to any disclaimer, the term of this patent is extended or adjusted under 35 U.S.C. 154(b) by 124 days.

This patent is subject to a terminal disclaimer.

(21) Appl. No.: 10/959,491

(22) Filed: Oct. 5, 2004

(65) Prior Publication Data

US 2005/0045671 A1   Mar. 3, 2005

Related U.S. Application Data

(63) Continuation-in-part of application No. 10/278,713, filed on Oct. 23, 2002, now Pat. No. 6,966,689, which is a continuation-in-part of application No. 10/012,239, filed on Nov. 13, 2001, now Pat. No. 6,527,433.

(60) Provisional application No. 60/511,877, filed on Oct. 16, 2003, provisional application No. 60/248,254, filed on Nov. 13, 2000.

(51) Int. Cl.
*B65B 1/04* (2006.01)

(52) U.S. Cl. .................. 141/82; 99/348; 366/192

(58) Field of Classification Search .................. 141/9, 141/100, 82; 366/189, 192, 205, 302, 306, 366/314, 347, 349, 195–196; 99/348
See application file for complete search history.

(56) References Cited

U.S. PATENT DOCUMENTS 1,412,536 A    4/1922   Mayer 1,874,079 A    8/1932   Black (Continued)

FOREIGN PATENT DOCUMENTS

DE          1098171          1/1961

(Continued)

OTHER PUBLICATIONS

Owner's Manual & Recipe Book, Automatic Hot Milk Frother, Froth Aulait Models FAL-W & FAL-B, no date.

(Continued)

*Primary Examiner*—Steven O. Douglas
(74) *Attorney, Agent, or Firm*—Thorpe North & Western

(57) ABSTRACT

A beverage mixer and heater device includes a container disposable on a base. The container includes a heating element and a faucet. A cup indentation extends into the base underneath the faucet. The device also include means for aligning the faucet of the container with the cup indentation of the base, including a mating electrical plug disposed between the base and the container with one portion electrically coupled to the heating element of the container and another portion carried by the base. The base has a bottom with an inward and downward taper under the faucet to facilitate the base tipping from an upright configuration to a tipped configuration in a direction of the faucet. A method for making a hot beverage includes simultaneously turning the hot beverage with the mixing assembly and dispensing the hot beverage through a faucet coupled near a bottom of the container.

27 Claims, 4 Drawing Sheets

U.S. PATENT DOCUMENTS

| | | |
|---|---|---|
| 2,066,997 A | 1/1937 | Mueller |
| 2,070,545 A | 2/1937 | Gilbert |
| D118,470 S | 1/1940 | Drachenberg |
| 2,282,866 A | 5/1942 | Hagen |
| 2,311,379 A | 2/1943 | Gillanders |
| 2,315,018 A | 3/1943 | Lawrence |
| D153,645 S | 5/1949 | Stiles |
| D156,635 S | 12/1949 | Law et al. |
| D161,188 S | 12/1950 | Klug |
| 2,559,196 A | 7/1951 | Medved |
| 2,710,707 A | 6/1955 | Persak, Jr. |
| 2,785,547 A | 3/1957 | Barros |
| D183,177 S | 7/1958 | Oertli |
| 2,945,634 A | 7/1960 | Beck et al. |
| D189,904 S | 3/1961 | Seltsam |
| 3,013,775 A | 12/1961 | Bruntjen |
| 3,042,265 A | 7/1962 | Rodth |
| D194,389 S | 1/1963 | Bejamin |
| 3,088,345 A | 5/1963 | Campbell |
| 3,104,089 A | 9/1963 | Seltsam |
| 3,107,711 A | 10/1963 | Azmus |
| D200,230 S | 2/1965 | Seltsam |
| D205,827 S | 9/1966 | Plagenberg |
| 3,346,029 A | 10/1967 | Harris |
| 3,355,068 A | 11/1967 | Harland |
| 3,417,972 A | 12/1968 | Vincent |
| 3,427,636 A | 2/1969 | Seifert |
| 3,765,275 A | 10/1973 | Johnson |
| 3,780,393 A | 12/1973 | Gaetke |
| 3,895,548 A | 7/1975 | Sauve |
| 3,920,224 A | 11/1975 | Fassauer |
| 3,938,784 A | 2/1976 | Moreton |
| 4,030,707 A | 6/1977 | Moreton |
| D249,701 S | 9/1978 | Maples et al. |
| 4,116,366 A | 9/1978 | Takenakashima et al. |
| 4,137,578 A | 2/1979 | Felici |
| 4,201,487 A | 5/1980 | Backhaus |
| 4,250,771 A | 2/1981 | Berler |
| 4,252,160 A | 2/1981 | Numbers |
| 4,268,080 A | 5/1981 | Lindley |
| 4,357,861 A | 11/1982 | Di Girolamo |
| D268,841 S | 5/1983 | Adams |
| D269,471 S | 6/1983 | Auerbach |
| 4,395,792 A | 8/1983 | Cosner |
| 4,397,427 A | 8/1983 | Howard |
| D271,368 S | 11/1983 | Belland et al. |
| 4,488,664 A | 12/1984 | Cleland |
| 4,501,538 A | 2/1985 | Bray et al. |
| 4,513,688 A | 4/1985 | Fassauer |
| 4,537,332 A | 8/1985 | Brown et al. |
| 4,561,782 A | 12/1985 | Jacobsen et al. |
| D295,138 S | 4/1988 | Hyde |
| 5,048,402 A | 9/1991 | Letournel et al. |
| D337,234 S | 7/1993 | McGinnis |
| 5,302,021 A | 4/1994 | Jennett et al. |
| 5,323,691 A | 6/1994 | Reese et al. |
| D363,634 S | 10/1995 | Cohn |
| 5,479,851 A | 1/1996 | McClean et al. |
| D370,151 S | 5/1996 | McLinden et al. |
| D378,400 S | 3/1997 | Kowalics |
| D379,050 S | 5/1997 | Kohanski |
| 5,662,032 A | 9/1997 | Baratta |
| 5,671,664 A | 9/1997 | Jacobson |
| 5,690,021 A | 11/1997 | Grey |
| D412,262 S | 7/1999 | Roundtree |
| 6,065,861 A | 5/2000 | Chen |
| 6,158,626 A | 12/2000 | Guerra et al. |
| 6,283,625 B2 | 9/2001 | Frankel et al. |
| 6,318,247 B1 | 11/2001 | Di Nunzio et al. |
| D463,194 S | 9/2002 | Busick et al. |
| 6,527,433 B2 | 3/2003 | Daniels, Jr. |
| D473,421 S | 4/2003 | Daniels, Jr. |
| D474,065 S | 5/2003 | Daniels, Jr. |
| D474,067 S | 5/2003 | Daniels, Jr. |
| D474,643 S | 5/2003 | Daniels, Jr. |
| 6,609,821 B2 | 8/2003 | Wulf et al. |
| D482,235 S | 11/2003 | Yui |
| D483,607 S | 12/2003 | Chang Chien |
| D493,331 S | 7/2004 | Munoz |
| 6,817,750 B1 | 11/2004 | Sands |
| 6,837,153 B1 | 1/2005 | Chang Chien |
| 6,981,795 B2 | 1/2005 | Nikkah |
| 6,966,689 B2 * | 11/2005 | Daniels, Jr. ............... 366/192 |
| 2001/0006486 A1 | 7/2001 | Ofverberg |
| 2002/0080678 A1 | 6/2002 | Daniel, Jr. |
| 2003/0099154 A1 | 5/2003 | Daniels, Jr. |
| 2004/0264294 A1 | 12/2004 | Pryor |
| 2005/0018532 A1 | 1/2005 | Nikkah |
| 2005/0018534 A1 | 1/2005 | Nikkah |
| 2005/0045671 A1 | 3/2005 | Beesley |
| 2005/0185507 A1 | 8/2005 | Beesley |
| 2005/0207270 A1 | 9/2005 | Beesley |
| 2006/0176765 A1 | 8/2006 | Pryor et al. |

FOREIGN PATENT DOCUMENTS

| | | |
|---|---|---|
| DE | 29816201 | 2/2000 |
| EP | 1475024 | 11/2004 |
| GB | 764361 | 12/1956 |
| JP | 7-227165 | 8/1995 |
| JP | 7-227166 | 8/1995 |
| JP | 7-231856 | 9/1995 |
| JP | 2004-41286 | 2/2004 |
| JP | 2004-65325 | 3/2004 |
| JP | 2004-113278 | 4/2004 |
| JP | 2004 357752 | 12/2004 |
| JP | 2005-328946 | 12/2005 |
| JP | 2006-102083 | 4/2006 |
| WO | WO2004/080252 | 9/2004 |
| WO | WO 2005/037036 | 4/2005 |

OTHER PUBLICATIONS

Operating Instructions for the Mr. Coffee Cocomotion Hot Chocolate Maker, pp. 1-16, no date.

Eight (8) color images of a Hamilton Beach product. Upon information and belief of applicant or applicants' attorneys, this information represents a product that was known or used by others in this country before the invention thereof by the applicants for patent, or was in public use or on sale in this country more than one year prior to the date of the application for patent in the United States.

Krups/Model #267-70. Upon information and belief of applicant or applicants' attorneys, this information represents a product that was known or used by others in this country before the invention thereof by the applicants for patent, or was in public use or on sale in this country more than one year prior to the date of the application for patent in the United States.

Krups Instructions for Use Product Manual for Model #267. Upon information and belief of applicant or applicants' attorneys, this product manual represents a printed publication in this country or a foreign country, before the invention thereof by the applicant for patent, or more than one year prior to the date of the application for patent in the United States.

Hamilton Beach/Model #3920J. Upon information and belief of applicant or applicants' attorneys, this information represents a product that was known or used by others in this country before the invention thereof by the applicants for patent, or was in public use or on sale in this country more than one year prior to the date of the application for patent in the United States.

Hamilton Beach Use & Care Product Manual for 1 & 2 Speed Juice Extractors. Upon information and belief of applicant or applicants' attorneys, this product manual represents a printed publication in this or a foreign country, before the invention thereof by the applicant for patent, or more than one year prior to the date of the application for patent in the United States.

Proctor Silex/Model #J101W. Upon information and belief of applicant or applicants' attorneys, this information represents a product that was known or used by others in this country before the invention thereof by the applicants for patent, or was in public use or on sale in this country more than one year prior to the date of the application for patent in the United States.

Sunbeam Oster/Model #323-08. Upon information and belief of applicant or applicants' attorneys, this information represents a product that was known or used by others in this country before the invention thereof by the applicants for patent, or was in public use or on sale in this country more than one year prior to the date of the application for patent in the United States.

Santos/Model #N 176944. Upon information and belief of applicant or applicants' attorneys, this information represents a product that was known or used by others in this country before the invention thereof by the applicants for patent, or was in public use or on sale in this country more than one year prior to the date of the application for patent in the United States.

Hamilton Beach/Model #395WS. Upon information and belief of applicant or applicants' attorneys, this information represents a product that was known or used by others in this country before the invention thereof by the applicants for patent, or was in public use or on sale in this country more than one year prior to the date of the application for patent in the United States.

Hamilton Beach/Model #67150. Upon information and belief of applicant or applicants' attorneys, this information represents a product that was known or used by others in this country before the invention thereof by the applicants for patent, or was in public use or on sale in this country more than one year prior to the date of the application for patent in the United States.

Hamilton Beach Use & Care Manual for Juice Extractor. Upon information and belief of applicant or applicants' attorneys, this product manual represents a printed publication in this or a foreign country, before the invention thereof by the applicant for patent, or more than one year prior to the date of the application for patent in the United States.

Hamilton Beach/Model #96600. Upon information and belief of applicant or applicants' attorneys, this information represents a product that was known or used by others in this country before the invention thereof by the applicants for patent, or was in public use or on sale in this country more than one year prior to the date of the application for patent in the United States.

Hamilton Beach Operation Manual for Juicer #96700 and 1G96700. Upon information and belief of applicant or applicants' attorneys, this product manual represents a printed publication in this or a foreign country, before the invention thereof by the applicants for patent, or more than one year prior to the date of the application for patent in the United States.

Hamilton Beach//Proctor Silex, Inc./Model #67150. Upon information and belief of applicant or applicants' attorneys, this information represents a product that was known or used by others in this country before the invention thereof by the applicants for patent, or was in public use or on sale in this country more than one year prior to the date of the application for patent in the United States.

10 Crescent Lane Mar. 2001 Catalog, Jenn-Air Artrezi Blender.

Frontgate Outfitting America's Finest Homes, Early Spring 2004 Catalog, Item #13861 Artrezi Blender.

Frontgate outfitting America's Finest Homes, Fall 2002 Catalog, T-Fal, Item #16513 Chrome 40 Oz. Blender.

Owner's Manual & Recipe Book, Automatic Hot Milk Frother, Froth Aulait Models FAL-W & FAL-B (© 2001).

Operating Instructions for the Mr. Coffee Cocomotion Hot Chocolate Maker, pp. 1-16 (© 2002).

\* cited by examiner

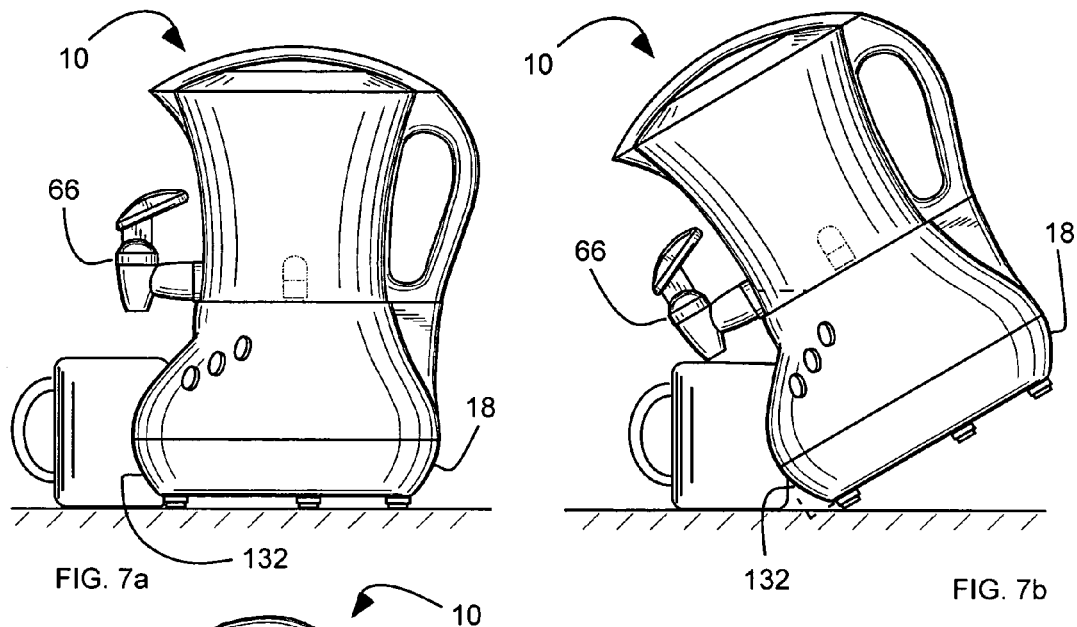
FIG. 7a
FIG. 7b
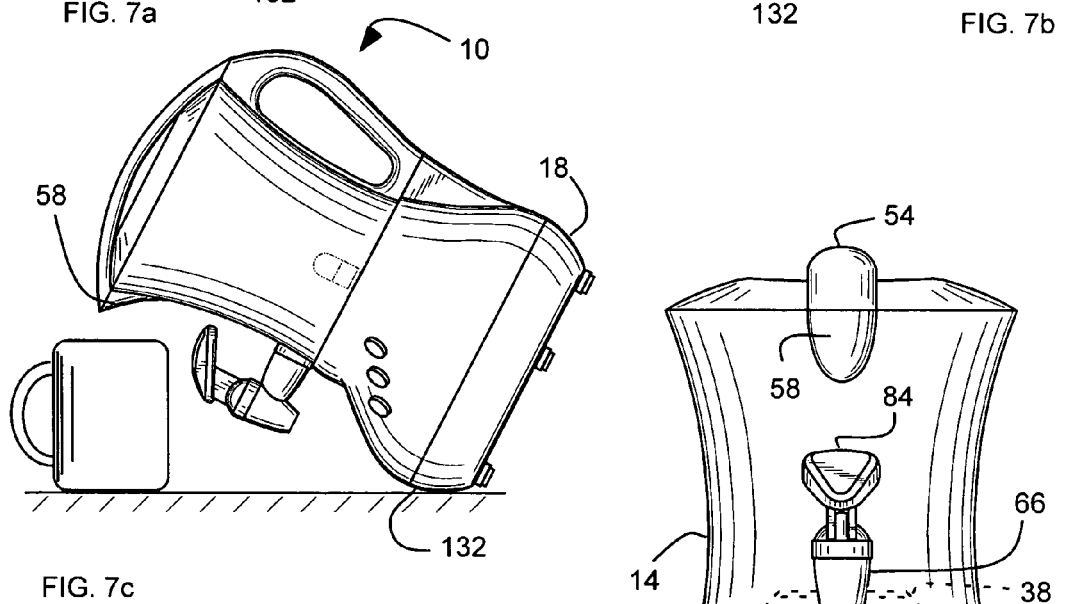
FIG. 7c
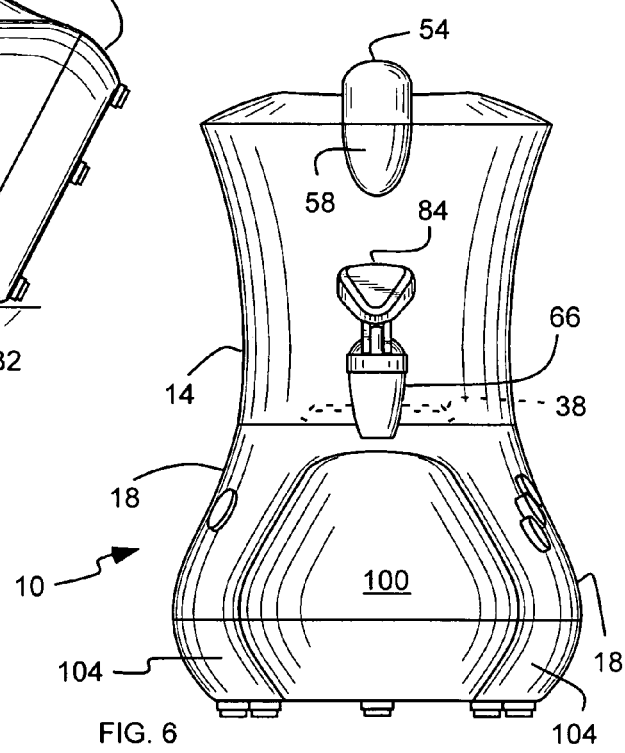
FIG. 6

BEVERAGE MIXER AND HEATER

CROSS-REFERENCE TO RELATED APPLICATIONS AND CLAIM OF PRIORITY

Benefit is claimed of U.S. Provisional Patent Application Ser. No. 60/511,877 filed on Oct. 16, 2003. This is a continuation-in-part of U.S. patent application Ser. No. 10/278,713, filed Oct. 23, 2002 U.S. Pat. No. 6,966,689, which is a continuation-in-part of Ser. No. 10/012,239, now U.S. Pat. No. 6,527,433, filed Nov. 13, 2001, which claims the benefit of U.S. Provisional Patent Application Ser. No. 60/248,254, filed Nov. 13, 2000.

BACKGROUND

The present invention relates generally to a beverage mixer and heater for use in making hot beverages, such as a cocoa or hot chocolate, coffee, cappuccinos and lattes.

Hot drinks have become increasingly popular. Such drinks include hot chocolate, cappuccinos and lattes. Such drinks often require more complicated processing and/or more complex ingredients. For example, such drinks can include heating or brewing ingredients, steamed ingredients, foamed or frothed ingredients, etc. Typically, such drinks are available at specialty stores, such as coffee shops, and are made with expensive and complicated, commercial grade equipment or specialty machines. Therefore, it is often difficult to make such drinks at home. One disadvantage with making such drinks at home is that they are of poorer quality due to the inadequacies of typical kitchen appliances. For example, the various ingredients can separate, such as the foam or froth separating from the coffee or cocoa.

Various devices have been proposed to make hot drinks. An example of such a device is the Mr. Coffee® Cocomotion® hot chocolate maker by Sunbeam Products, Inc., Boca Raton, Fla. 33431. See also U.S. Pat. No. 6,318,247. Such devices heat and stir beverages in a vessel with an integral heating element and an integral mixing motor. The heating element and mixing motor are disposed in an integral base of the vessel. The vessel has an upper pouring chute at an upper edge to pour the contents from the vessel. The vessel and/or base have an enlarged bottom portion so that the lowermost portion of the base is widest.

One disadvantage of such devices is the difficulty of pouring the heated drinks. The device must be tipped, including the integral heater and integral motor, to pour the contents. In addition, such devices often require that the device be shut off, and be unplugged, before the contents are poured, allowing for separation of the ingredients. It will be appreciated that once the motor or mixer stops turning, the contents can begin to separate, with the frothy portion rising to the top and the beverage portion settling to the bottom. In addition, it will be appreciated that as the vessel is tipped, the frothy portion floats while the beverage portion runs out of the vessel. Thus, a frustrating an inconsistent dispensing experience can result.

Other devices have been proposed to froth milk to be added to hot drinks. An example of such a device is the Froth au Lait™ hot milk frother by Froth au Lait, Torrance, Calif. 90501. See also U.S. Pat. No. 6,283,625. Such devices are similar to those described above, but have a container with a pair of paddles and removable from a base with a heater and a motor. The container has an upper pour chute at an upper edge of the container to pour the contents from the container. The container and base also have an enlarged bottom portion so that the lowermost portion of the base is widest. Such devices are used to froth milk, which is then added to the desired beverage. In addition, such devices teach to shut off the device once the heating a frothing cycle is complete, and allowing the hot milk to settle. The hot milk can then be poured from the top by tilting the container, or the froth can be spooned from the container.

SUMMARY

It has been recognized that it would be advantageous to develop an improved beverage mixer and heater to facilitate dispensing of a heated beverage and resisting separation of the ingredients.

Briefly, and in general terms, the invention is directed to a beverage mixer and heater device with a container removably disposable on a base, with a mixing assembly of the container rotatably disposed therein and engagable by a drive mechanism of the base when the container is disposed on the base. A heating element is disposed in the container, and a faucet is operatively coupled to the container. A cup indentation extends into the base underneath the faucet when the container is disposed on the base. The device includes means for aligning the faucet of the container with the cup indentation of the base, including a mating electrical plug disposed between the base and the container with one portion electrically coupled to the heating element of the container and another portion carried by the base.

In addition, the invention is directed to a beverage mixer and heater device with a container removably disposable on a base, with a mixing assembly of the container rotatably disposed therein and engagable by a drive mechanism of the base. A heating element is associated with the container and a faucet is operatively coupled to the container, to dispense contents thereof, and having an outlet opening. A cup indentation extends into the base under the faucet, and extends vertically through the base from a top adjacent the faucet to a support surface upon which the base is disposed.

In addition, the invention is directed to a beverage mixer and heater device with a container disposable on a base, with a mixing assembly of the container rotatably disposed therein and engagable by a drive mechanism of the base. The container includes a heating element and a faucet operatively coupled to the container. The base has a bottom with an inward and downward taper under the faucet to facilitate the base tipping from an upright configuration to a tipped configuration in a direction of the faucet.

In addition, the invention is directed to a method for making a hot beverage by introducing ingredients into a container; mixing and heating the ingredients in the container with a mixing assembly and a heating element operatively engaging the container to make the hot beverage; and simultaneously turning the hot beverage with the mixing assembly and dispensing the hot beverage through a faucet coupled near a bottom of the container.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 6 is a front view of the beverage mixer and heater of FIG. 1;

FIGS. 7a-c are side views of the beverage mixer and heater of FIG. 1 with a cup received in a cup indentation, with FIGS. 7b and c showing various degrees of tipping;

Figure 1:
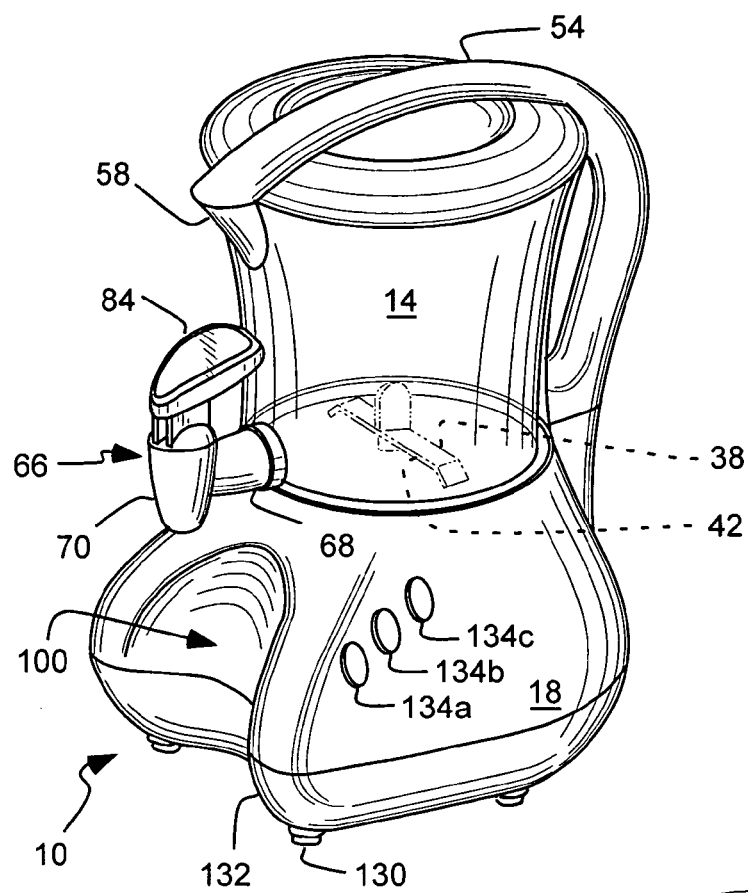
FIG. 1 is a perspective view of a beverage mixer and heater in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

As illustrated in FIGS. 1-9, a beverage mixer and heater 10 is shown in an exemplary embodiment for making hot drinks, including for example, hot chocolate, cocoa, cappuccino, latte, mocha, flavored steamed milk, tea latte, cider, wassail, toddy, grog, tea, coffee, soup and the like. Such hot drinks are examples of a field that may benefit from use of such a device 10. The beverage mixer and heater 10 advantageously includes a faucet and cup indentation to facilitate pouring of the hot drink, as discussed in greater detail below.

The beverage mixer and heater 10 can include a container or jar 14 disposable on a base or housing 18. The container 14 can be removably disposed on the base (as shown in FIG. 3), and thus can be removed from the base 18 for cleaning, etc., while the base can include electrical components, motors, and the like. The base 18 can include a motor 22 (FIG. 2) capable of turning a drive mechanism 26 (FIGS. 2 and 4) that extends from the base 18. In one aspect, the drive mechanism 26 can be located at a top of the base 18, and the container 14 can be disposable on the top of the base 18, and on top of the drive mechanism 26. Thus, the container 14 can utilize gravity to help maintain the container 14 on the base 18.

Figure 4:
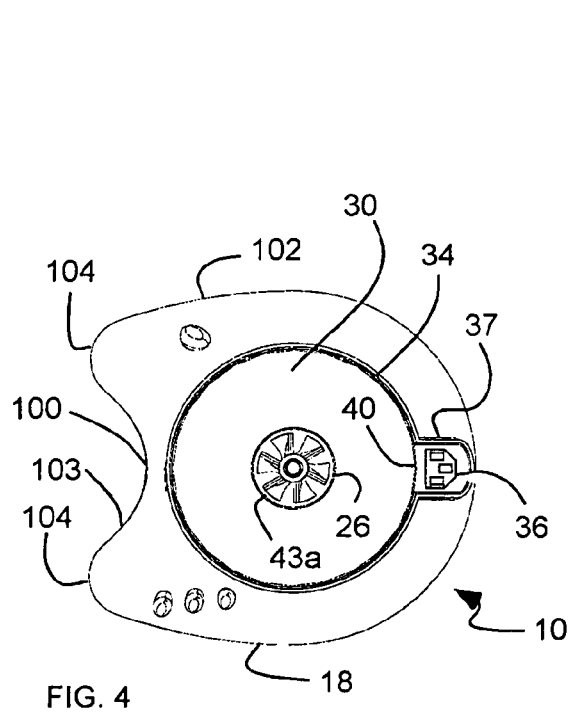
FIG. 4 is a top view of the base of the beverage mixer and heater of FIG. 1.

A receptacle or socket 30 (FIG. 4) can be formed with the base 18 and configured to receive the container 14, or a portion thereof. The receptacle 30 can be formed on the top of the base 18 with the drive mechanism 26 disposed within the receptacle 30. The receptacle 30 can include a perimeter wall 34 to receive the container 14, or portion thereof, therein. In one aspect, the receptacle 30 can be substantially circular, and the perimeter wall 34 can be a substantially annular wall. In addition, the base 18 or receptacle 30 can include an electrical coupling 36 (FIG. 4). The electrical coupling 36 can be a socket configured to receive a mating plug. The receptacle 30 or perimeter wall 34 can include a protruding portion 37, and the electrical coupling 36 can be disposed in the protruding portion. The protruding portion can help align the container 14 with the base 18. In addition, the electrical coupling 36 or socket can be raised from the bottom of the receptacle 30 to resist liquid from entering the electrical coupling. Furthermore, the electrical coupling 36 or socket can be disposed in a protruding portion 37 of the receptacle 30 or perimeter wall 34 with a raised portion or barrier 40 disposed between the receptacle 30 and electrical coupling 36 to resist liquid from entering the electrical coupling.

The container 14 can include a mixing assembly 38 with one or more blades or paddles 42 rotatably disposed in the container 14. The blades or paddles 42 can be tab-like protrusions. For example, a pair of tabs can extend in opposite directions. The tabs can extend horizontally with distal ends that extend downwardly at an incline. Such a configuration has been found to whip the ingredients or beverages adequately, without throwing or propelling the ingredients upwardly. The mixing assembly 38 can be engaged by the drive mechanism 26 of the base 18 when the container 14 is disposed on the base 18, or in the receptacle 30. For example, the drive mechanism 26 and the mixing assembly 38 can include mating or matching couplings 43a and 43b, such as one or more intermeshing protrusions and indentations, so that the rotation and force of the motor 22 in the base can be transferred to the mixing assembly 38 or blades 42 in the container 14. The mixing assembly can be fixedly retained in the container, such as with a threaded fastener. A lower portion or bottom of the container 14 can be configured to mate or match the receptacle 30 to help maintain the container 14 on the base 18, and to properly align the mixing assembly 38 of the container 14 with the drive mechanism 26 of the base 18, or couplings thereof. Thus, the lower portion or bottom of the container 14 can be substantially circular to match the substantially circular shape of the receptacle 30.

Figure 5:
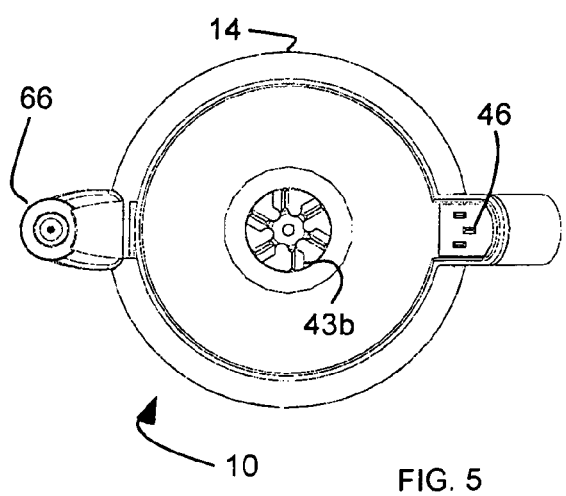
FIG. 5 is a bottom view of the container of the beverage mixer and heater of FIG. 1.

In addition, the container 14 can include a heating element 44 (FIG. 2) disposed therein or associated therewith. The heating element can be an electrical resistance type heating element that heats upon application of a current. The heating element can have an annular shape to surround the mixing assembly, and can have a flat upper surface to abut to a bottom of the container, to maximize surface area, and thus heat transfer, with the container. The heating element can be operatively engaged by the electrical coupling 36 when the container 14 is disposed on the base 18, or in the receptacle 30. Thus, the container 14 can include a mating electrical coupling 46 (FIG. 5). The electrical coupling 46 can be a plug that mates with the socket on the base. The container 14 can include a base or bottom portion 47 secured to a container portion 50. The base or bottom portion 47 (FIG. 3a) can be circular to match the circular shape of the receptacle 30 as described above. The base portion 47 of the container 14 can form a compartment to contain the heating element 44 and to carry the electrical coupling 46 of the container. The mixing assembly 38 can cooperate with the base portion 47 to engage the drive mechanism 26 of the base 18.

The container portion 50 can include a hollow shell with an annular wall to receive ingredients therein. In one aspect, the container portion 50 or shell or wall can be transparent or translucent, or formed of a transparent or translucent material, to enable viewing the contents of the container 14. A top of the shell or container 14 can be open to receive ingredients therethrough, while the bottom of the shell can be open to receive the mixing assembly 38 and/or base portion 47 so that the mixing assembly 38 or blades 42 can operatively engage the contents of the container 14. The base portion 47 can be configured to enclose the bottom of the container 14 or container portion 50. Thus, the base portion 47 and container portion 50 can form the container 14.

Figure 8A:
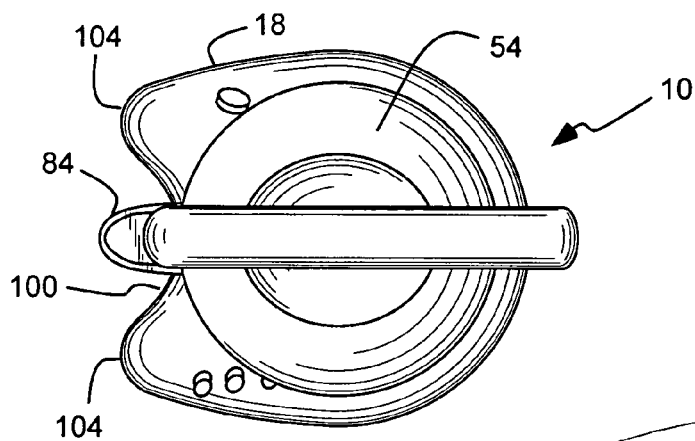
FIGS. 8a-c are tip views of the beverage mixer and heater of FIG. 1, with FIG. 8a showing a lid in a closed position, FIG. 8b showing the lid in an open position, and FIG. 8c showing the lid removed.
Figure 8B:
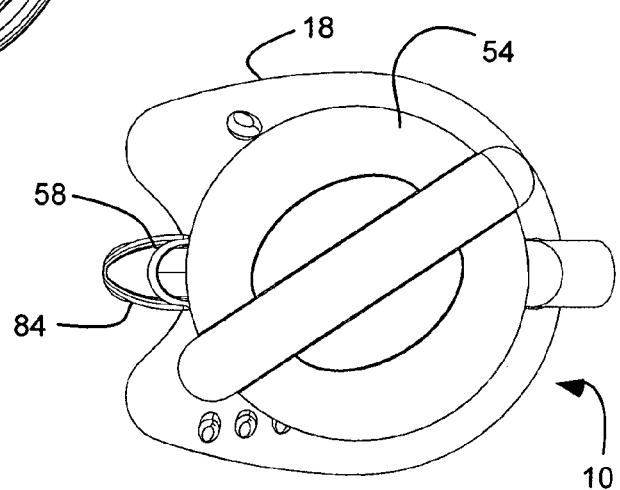

A lid 54 can be removably disposed on the container 14 to resist expulsion of the contents or the ingredients in the container during mixing, or while the blades 42 are rotating. The ingredients can be introduced into the container 14 by removing the lid 54 and inserting the ingredients into the container 14. The container can include a dispensing chute 58 in the top thereof so that the contents of the container can be disposed through the chute by tipping the container. In addition, the lid 54 can be pivotally disposed on the container and can include a downward protrusion 62 that selectively closes the chute by turning the lid. Thus, the lid 54 can be turned to one position to close the chute (FIG. 8*a*), and turned to another position to open the chute (FIG. 8*b*).

A spigot, spout or faucet 66 is operatively coupled to the container 14 at or near the bottom of the container 14. The faucet 66 advantageously allows the contents of the container 14 to be selectively dispensed through the faucet 66, as opposed to being poured through the top of the container. In addition, the faucet 66 advantageously allows the contents to be dispensed while the mixing assembly is operating so that the contents can be simultaneously mixed and dispensed. The faucet 66 can have a proximal end 68 coupled to the container, and a distal end 70 with an outlet opening 72.

The container 14 or base portion 47 can have an outlet aperture or opening 74 (FIG. 2), with the proximal end 68 of the faucet 66 coupled to the container or base portion at the opening. The faucet 66 can form a fluid channel through with the contents of the container flow to be dispensed. The faucet 66 can include any type of valve and/or actuation system. For example, the faucet 66 can include a handle 84 for displacing a plunger type valve 88 (FIG. 2) within the faucet 66. Thus, by lifting/depressing/turning the handle 84, the valve 88 is displaced allowing the contents of the container 14 to flow through the faucet 66. The valve 88 and/or actuator or handle 84 can be positioned at a distal end 70 of the spout. The faucet 66 extends outwardly and away from the container 14, to a position beyond a perimeter of the base so that the contents can be dispensed while the container remains on the base, and while the mixing element is turning.

The container 14 and base 18 advantageously are configured to facilitate dispensing the contents of the container 14 through the faucet 66. The contents of the container, such as hot chocolate, cappuccino or latte, can include a froth or foam, and thus can be difficult to dispense by pouring out of the top of the container. While the faucet 66 could have a length that extends beyond the base in order to pour, it has been recognized that the base 18 itself can be configured to reduce the length of the faucet 66. The base 18 itself can include an indentation configuration with a beverage cup accommodation indentation 100. The cup indentation 100 is positioned under the outlet opening 72 of the faucet 66 so that when the container 14 is disposed on the base 18, a beverage cup can be more conveniently placed in the indentation 100 and under the faucet 66, as shown in FIG. 7*a*. The cup indentation 100 advantageously extends into the base 18 to reduce the length of the spout 80, and thus reduces frictional loses of contents flowing through the spout.

Figure 2:
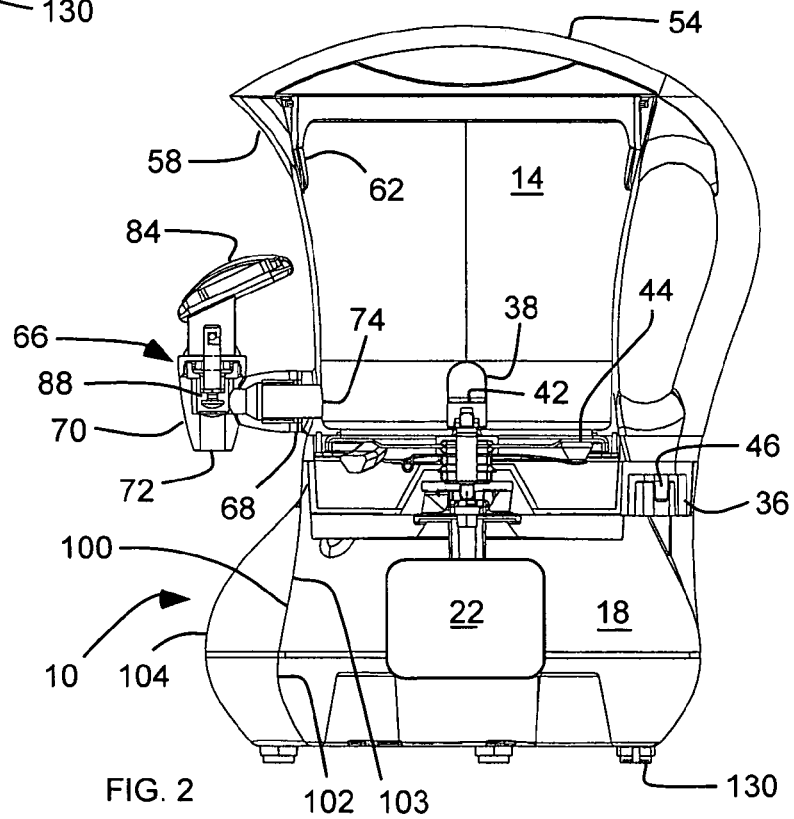
FIG. 2 is a cross-sectional side view of the beverage mixer of FIG. 1.
Figure 3A:
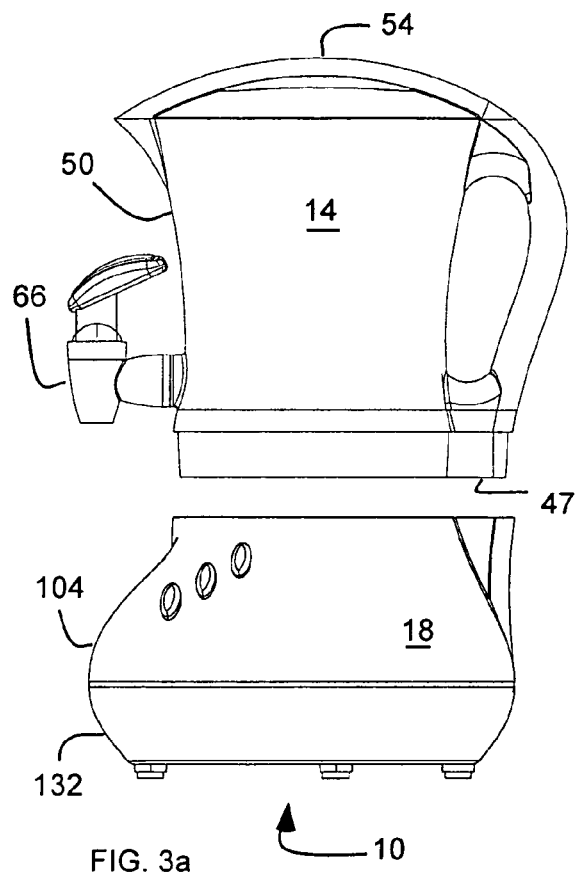
FIG. 3a is a side view of the beverage mixer and heater of FIG. 1, shown with a container removed from a base.
Figure 3B:
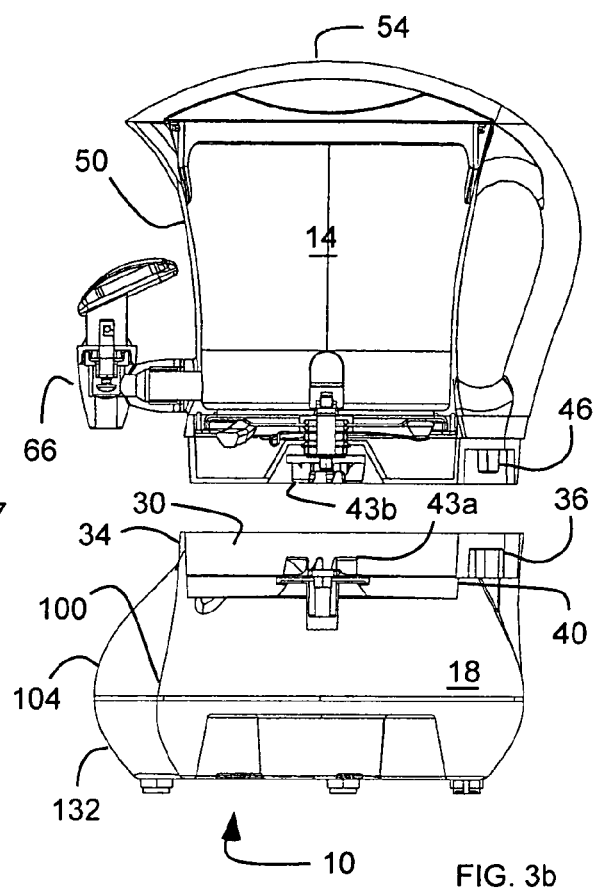
FIG. 3b is a cross-sectional side view of the beverage mixer and heater of FIG. 1, shown with the container removed from the base.

Referring to FIG. 2, the base 18 can include a perimeter base wall 102 extending around and defining a perimeter of the base 18. The indentation 100 can be formed in a perimeter of the base 18 by the perimeter base wall 102. The indentation 100 can extend horizontally into the base 80, and can be formed by a substantially vertically oriented portion 103 of the perimeter base wall 102. The vertically oriented portion 103 of the perimeter base wall 102 extends from a top of the indentation 100 proximate the faucet 66 when the container 14 is disposed on the base, to a bottom of the indentation 100 proximate a bottom of the base, or to the support surface upon which the base is disposed. Thus, the indentation 100 can be open through to a support surface under the base 18. In addition, the substantially vertically oriented portion 103 of the perimeter base wall 102 can have a curvature or inward taper at an upper end thereof to facilitate tipping of the device, as described below.

One or more protrusion 104 can extend horizontally outward from the base 18 adjacent the cup indentation 100. Thus, the cup indentation 100 can be disposed between, and defined by, protrusions 104 on either side. The protrusions 104 can be formed in the base 18 to properly position a cup or glass under the faucet 66 to resist spills. In addition, the protrusions 104 can resist undesired tipping of the device when the faucet 66 or handle 84 is activated. Thus, a lowermost portion of the protrusions contacting the support surface can extend laterally outwardly to at least a position substantially vertically under the handle 84. Thus, as a user depresses the handle 84, the protrusions resist undesired tipping of the container, base or device.

The container 14 is placed on the base 18 so that the faucet 66 is aligned with the cup indentation 100. As described above, the container and base can include a mating electrical plug, such as the socket in the base to receive the mating plug on the container. The mating electrical plug is an example of one means for aligning the faucet of the container with the cup indentation of the base.

The base 18 can be configured to be disposed on a support surface, such as a counter or work surface. Feet or tabs 130 can be located on the bottom of the base 18 so that base 18 rests on the feet or tabs 130. The feet or tabs 130 can be formed of a high friction material, such as rubber or the like, to resist sliding or movement of the base during operation. In one aspect, the feet or tabs 130 can be located inwardly from a perimeter of the base 18, or with the alignment protrusions 104 extending outwardly past the feet or tabs 130. Thus, the base 18 can be positioned on the edge of the counter or work surface, so that the spout 66 and alignment protrusions 104 extend past the edge, so that a larger glass can be positioned under the faucet 66 without interference from the counter or work surface. The feet 130 at the front of the base can form the lowermost portion of the protrusions 104 discussed above, and can extend laterally outwardly to at least a position substantially vertically under the handle 84 to resist undesired tipping.

In addition, the base 18 can have a bottom or bottommost portion with an inward and downward taper 132 under the faucet 66 to facilitate the base tipping from an upright configuration to a tipped configuration in a direction of the faucet. The taper 132 can be positioned at the front of the base, or at a side corresponding to the faucet 66. The taper 132 allows the user to deliberately tip the container and base to facilitate pouring through the faucet, as shown in FIG. 7*b*. It will be appreciated that tipping the device 10 can facilitate dispensing the remaining contents of the container through the spout. The taper 132 can be curvilinear, and the taper 132 can contact and pivot on the support surface, as shown in FIG. 7*c*. Thus, the device 10 can be pivoted even further to dispense contents through the upper chute 58 while the device 10 rests on the support surface. The curved taper 132 can facilitate a pivoting motion while the device is supported. Alternatively, the taper 132 can be linear. The container 14 can include a handle opposite the chute or faucet to allow a user to grasp and pivot the device. The fit between the container and base can be configures such that the device, or the container and base together, can be tipped by applying a lateral force, but the container can be separated from the base by applying a vertical upward force. For example, the walls of the receptacle and lower portion of the container can be substantially vertical.

Referring again to FIG. 1, controls or a control panel with buttons 134a-c for controlling the operation of the motor 22 or device 10 also can be disposed on the base 18. The controls or buttons 134 can be electrically coupled to the motor and/or heating element to control their operation. The buttons can include an on button 134a to turn the motor and heating element on; an off button 134b to turn the motor and heating element off; and a "dispense" button 134c to turn only the motor on so that the contents can be whipped while being dispensed, and to facilitate dispensing the contents. The "on" button 134a can be electrically coupled to the motor and the heating element to simultaneously mix and heat the beverage in the container. A thermostat can be operatively coupled to the motor and heating element and operable to electrically disconnect the motor and heating element at a predetermined temperature. Thus, the device can be set to heat and mixing automatically. In addition, the "off" button 134b can be provided to terminate mixing and heating. Furthermore, the motor and mixing assembly can be operated independently of the heating element so that the beverage can be simultaneously mixed and dispensed. For example, the separate dispensing or mixing button 134c can independently operate the motor to mix the contents. In addition, controls and/or buttons can be provided to vary the mixing speed. Similarly, controls and/or buttons can be provided to vary the heating or temperature.

Figure 8C:
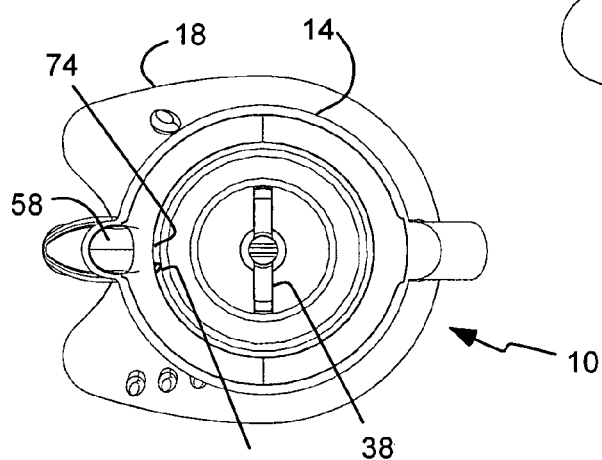

In operation the lid 54 can be removed from the container 14 (as shown in FIG. 8c) and ingredients for a hot drink placed within the container 14. For example, the ingredients can include a drink or flavor mix, such as chocolate, and a liquid, such as milk or water. The container 14 can include indicia indicating volume so that ingredients can be added to the container until certain indicia are reached. The container 14 may be disposed on the base 18 before the ingredients are placed in the container 14, or after. The mixing assembly 38 may be actuated, by operating the motor 22, in order to blend the ingredients within the container 14. In addition, the heating element can heat the ingredients simultaneously. The mixing assembly or blades can whip or froth the beverage. After the ingredients or contents are blended and heated, a glass or cup may be placed under the faucet 66, and in the cup indentation 100. The handle 84 of the faucet 66 can be operated to dispense the contents from the container 14, through the faucet, and into the cup or glass. The mixing assembly can be operated simultaneously to resist separation of the ingredients, and to help dispense the ingredients from the spout. In addition, the device can be tipped towards the faucet to facilitate dispensing the beverage.

To dispense the beverage, a cup can be disposed on the support surface upon which a base is disposed, and the cup can be inserted into the cup indentation 100 extending into the base so that the cup is located underneath the faucet 66 of the container. Thus, a user does not have to hold the cup while dispensing.

The container can be removably disposed on the base with the faucet 66 aligned with the cup indentation 100 by engaging the electrical connection for the heating element between the container and the base. Thus, the following actions can occur simultaneously: 1) removably disposing the container on a base; 2) engaging the mixing assembly carried by the container with a motor carried by the base; 3) electrically connecting the heating element carried by the container with an electrical supply on the base with mating plugs on the base and the container; and 4) aligning the faucet on the container with a cup indentation extending into the base with the mating plugs.

The container 14 can include a flow diversion protrusion 140 (FIG. 8c) that extends inwardly from a wall of the container 14 proximate the outlet aperture 74 to divert rotating contents through the outlet aperture and into the faucet. In addition, the mixing assembly 38 can propel the contents of the container outwardly, and towards the outlet 74 in the container and into the faucet 66.

In addition, the bottom of the inside of the container 14 can be sloped or bowl-shaped to facilitate cleaning.

Figure 9:
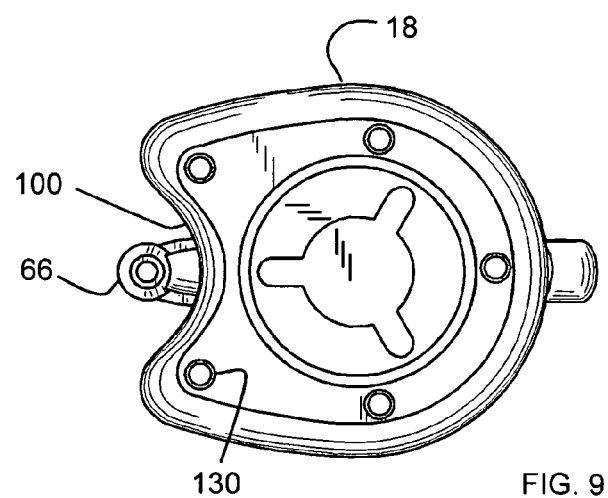
FIG. 9 is a bottom view of the beverage mixer and heater of FIG. 1.

Furthermore, a bottom of the base can include an annular recess area to receive a power cord, as shown in FIG. 9. A center post can be provided in the recess to wrap the power cord.

Various aspects of beverage mixers are set forth in U.S. Pat. No. 6,527,433 and U.S. patent application Ser. No. 10/278,713, which are herein incorporated by reference.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A beverage mixer and heater device, comprising:
   a) a base including a motor turning a drive mechanism;
   b) a container, removably disposable on the base, including a mixing assembly rotatably disposed therein and engagable by the drive mechanism when the container is disposed on the base, and a heating element disposed therein;
   c) a faucet, operatively coupled to the container, to dispense contents thereof, and having an outlet opening;
   d) a cup indentation, extending into the base underneath the faucet when the container is disposed on the base; and
   e) means for aligning the faucet of the container with the cup indentation of the base, including a mating electrical plug disposed between the base and the container with one portion electrically coupled to the heating element of the container and another portion carried by the base.

2. A device in accordance with claim 1, wherein the faucet further includes:
   a proximal end coupled to the container;
   an opposite distal end with an outlet opening; and
   a valve operable to allow and restrict contents of the container through the faucet.

3. A device in accordance with claim 1, wherein the cup indentation extends vertically through the base from a top adjacent the faucet to a support surface upon which the base is disposed so that a cup can be received under the faucet and upon the support surface.

4. A device in accordance with claim 1, further comprising:
   at least one protrusion, extending horizontally outward from the base adjacent the cup indentation.

5. A device in accordance with claim 1, wherein
the base has a bottom with an inward and downward taper under the faucet to facilitate the base tipping from an upright configuration to a tipped configuration in a direction of the faucet.

6. A device in accordance with claim 1, wherein the container further includes:
an outlet aperture near a bottom thereof between the container and the faucet through which contents exit the container; and
a flow diversion protrusion, extending inwardly from a wall of the container proximate the outlet aperture to divert rotating contents through the outlet aperture and into the faucet.

7. A device in accordance with claim 1, wherein the mixing assembly is fixedly retained within the container.

8. A beverage mixer and heater device, comprising:
a) a base including a motor turning a drive mechanism;
b) a container, removably disposable on the base, including a mixing assembly rotatably disposed therein and engagable by the drive mechanism;
c) a heating element, associated with the container;
d) a faucet, operatively coupled to the container, to dispense contents thereof, and having an outlet opening; and
e) a cup indentation, extending into the base under the faucet, and extending vertically through the base from a top adjacent the faucet to a support surface upon which the base is disposed.

9. A device in accordance with claim 8, wherein the faucet further includes:
a proximal end coupled to the container;
an opposite distal end with an outlet opening; and
a valve operable to allow and restrict contents of the container through the faucet.

10. A device in accordance with claim 8, further comprising:
means for aligning the faucet of the container with the cup indentation of the base, including a mating electrical plug disposed between the base and the container with one portion electrically coupled to the heating element of the container and another portion carried by the base.

11. A device in accordance with claim 8, further comprising:
at least one protrusion, extending horizontally outward from the base adjacent the cup indentation.

12. A device in accordance with claim 8, wherein
the base has a bottom with an inward and downward taper under the faucet to facilitate the base tipping from an upright configuration to a tipped configuration in a direction of the faucet.

13. A device in accordance with claim 8, wherein the container further includes:
an outlet aperture near a bottom thereof between the container and the faucet through which contents exit the container; and
a flow diversion protrusion, extending inwardly from a wall of the container proximate the outlet aperture to divert rotating contents through the outlet aperture and into the faucet.

14. A device in accordance with claim 8, wherein the mixing assembly is fixedly retained within the container.

15. A beverage mixer and heater device, comprising:
a) a base including a motor turning a drive mechanism;
b) a container, disposable on the base, including a mixing assembly rotatably disposed therein and engagable by the drive mechanism, and including a heating element;
c) a faucet, operatively coupled to the container, to dispense contents thereof; and
d) the base having a bottom with an inward and downward taper under the faucet to facilitate the base tipping from an upright configuration to a tipped configuration in a direction of the faucet.

16. A device in accordance with claim 15, wherein the faucet further includes:
a proximal end coupled to the container;
an opposite distal end with an outlet opening; and
a valve operable to allow and restrict contents of the container through the faucet.

17. A device in accordance with claim 15, further comprising:
a cup indentation, extending into the base underneath the faucet.

18. A device in accordance with claim 17, wherein the cup indentation extends vertically through the base from a top adjacent the faucet to a support surface upon which the base is disposed so that a cup can be received under the faucet and upon the support surface.

19. A device in accordance with claim 17, further comprising:
at least one protrusion, extending horizontally outward from the base adjacent the cup indentation.

20. A device in accordance with claim 17, wherein the container is removably disposed on the base, and further comprising:
means for aligning the faucet of the container with the cup indentation of the base, including a mating electrical plug disposed between the base and the container with one portion electrically coupled to the heating element of the container and another portion carried by the base.

21. A device in accordance with claim 15, wherein the container further includes:
an outlet aperture near a bottom thereof between the container and the faucet through which contents exit the container; and
a flow diversion protrusion, extending inwardly from a wall of the container proximate the outlet aperture to divert rotating contents through the outlet aperture and into the faucet.

22. A device in accordance with claim 15, wherein the mixing assembly is fixedly retained within the container.

23. A beverage mixer and heater device, comprising:
a) a base including a motor turning a drive mechanism extending therefrom and an electrical coupling extending therefrom;
b) a container, removably disposable on the base, including a mixing assembly rotatably disposed therein and engagable by the drive mechanism when the container is disposed on the base, and a heating element disposed therein and operatively engagable by the electrical coupling when the container is disposed on the base;
c) a faucet, operatively coupled to the container, to dispense contents thereof, and having an outlet opening; and
d) a beverage cup accommodation indentation including an indentation configuration of the base, positioned under the outlet opening of the spout so that when the container is disposed on the base a beverage cup can be more conveniently placed under the spout in the indentation, and extending into the base.

24. A method for making a hot beverage, comprising the steps of:
a) introducing ingredients into a container;

b) mixing and heating the ingredients in the container with a mixing assembly and a heating element operatively engaging the container to make the hot beverage; and c) simultaneously turning the hot beverage with the mixing assembly and dispensing the hot beverage through a faucet coupled near a bottom of the container and further comprising the step of removably disposing the container on a base with the mixing assembly and heating element carried by the container and the mixing assembly engaging a motor carried by the base when the container is disposed on the base; and aligning a cup indentation extending into the base underneath the faucet of the container by engaging an electrical connection for the heating element between the container and the base.

25. A method in accordance with claim 24, further comprising the step of:

disposing a cup on a support surface upon which the base associated with the container is disposed; and inserting the cup into the cup indentation extending into the base, the cup indentation being located underneath the faucet of the container.

26. A method in accordance with claim 24, further comprising the step of:

positioning the cup under the faucet so that the cup is both 1) disposed on a support surface upon which the base associated with the container is disposed, and 2) inserted into the cup indentation extending into the base.

27. A method in accordance with claim 24, further comprising the step of:

tipping the container in a direction of the faucet while the base associated with the container remains disposed upon a support surface, the base having an inward taper at a bottom thereof corresponding to the faucet to allow the base to tip.

* * * * *